May 23, 1961 G. L. GRISDALE ET AL 2,985,875

RADIO COMMUNICATION SYSTEMS

Filed Dec. 24, 1958 2 Sheets-Sheet 1

INVENTORS:

George Lambert Grisdale & Arthur Bickers

By: Baldwin & Wight, ATTORNEYS

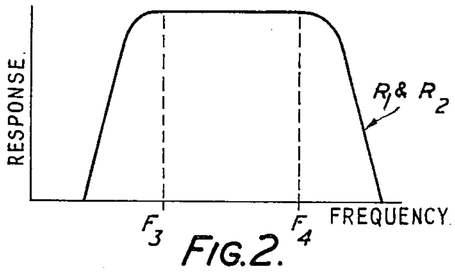
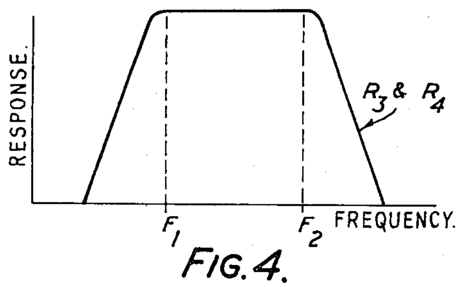
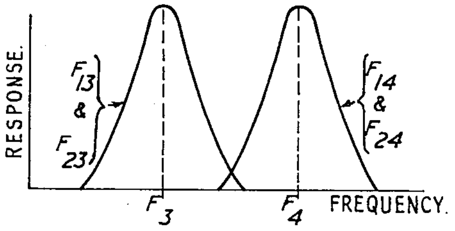
FIG.3.
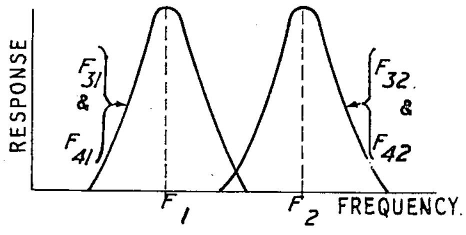
FIG.5.
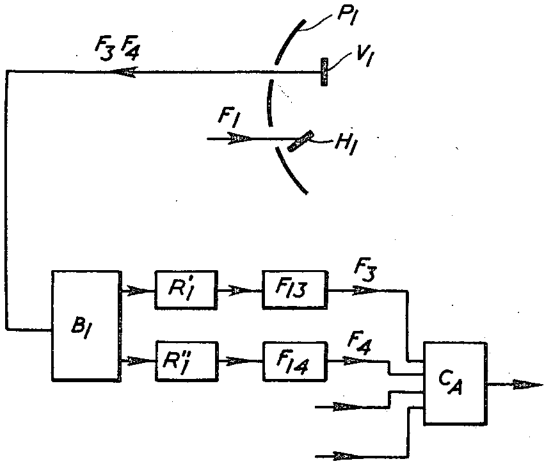
FIG. 6.
INVENTORS:
George Lambert Grisdale
&
Arthur Bickers
By: Baldwin & Wight, ATTORNEYS United States Patent Office 2,985,875

Patented May 23, 1961

2,985,875

RADIO COMMUNICATION SYSTEMS

George Lambert Grisdale, Great Baddow, and Arthur Bickers, Chelmsford, England, assignors to Marconi's Wireless Telegraph Company Limited, London, England, a British company Filed Dec. 24, 1958, Ser. No. 782,687

Claims priority, application Great Britain Feb. 12, 1958

5 Claims. (Cl. 343—100)

Figure 1:
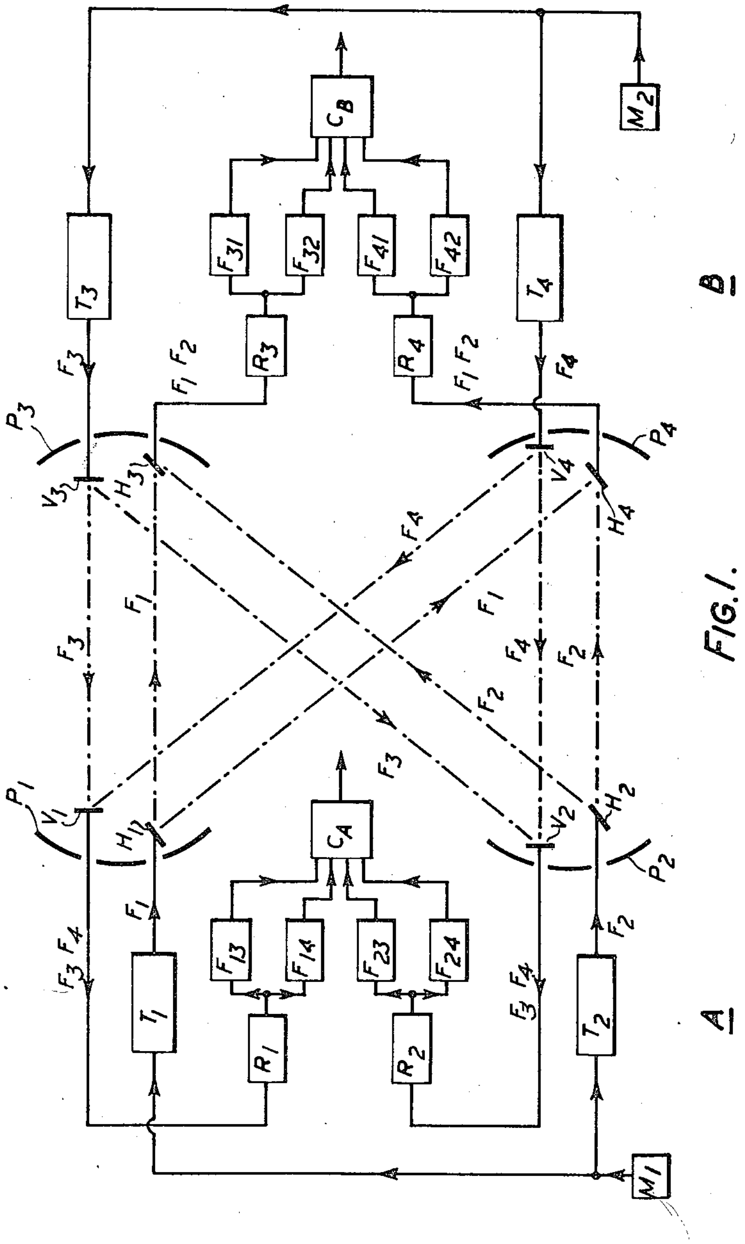

This invention relates to radio communication systems and stations. The object of the invention is to provide improved radio communication systems and stations adapted to give so-called diversity working and which shall be simpler and more economical of apparatus than known arrangements of comparable performance.

It is well know to reduce the results of fading in radio communication by so-called diversity working, that is to say, by receiving the same signal in a plurality of geographically spaced aerials and/or on a plurality of different frequencies or both, the idea being to provide a number of communication paths on which fading at any particular time is likely to be different, so that even if, at any time, the signal fades out in one of the paths it will probably be communicated over another.

Diversity working is in widespread use and is commonly employed in very high frequency systems effecting radio communication by so-called tropospheric scatter, for in such systems fading is a serious cause of trouble. However, many known proposals for effecting diversity working in tropospheric scatter and other very high frequency radio communication systems have the defect of being expensive in the apparatus required, principally in aerials, which account for a considerable proportion of the cost in such systems. In those known diversity working very high frequency systems wherein transmitters and receivers are connected to the same aerial element with the aid of branching filters there is still the defect of excessive cost since such filters are expensive.

Although not limited to its application thereto, the invention is primarily intended for and is of maximum advantage in tropospheric scatter and other very high frequency communication systems. As will be seen later the invention, when applied to such systems, provides what is in effect a quadruple diversity working (i.e. four communication paths) with only two aerial systems at each station and without transmitters and receivers connected to the same aerial element by the aid of branching filters.

According to this invention a radio communication station comprises two geographically spaced transmitting aerial elements having the same polarization, two transmitters each connected to a different one of said aerial elements, each of said transmitters being adapted to operate at a different one of two carrier frequencies, means for modulating both carriers with the same intelligence, two spaced receiving aerial elements having the same polarization as one another, said polarization being at right angles to the polarization of the transmitting aerial elements, one being near one of said transmitting aerial elements and the other being near the other transmitting aerial element, two receiving equipments each fed from a different one of the receiving aerial elements and each adapted to accept both of two predetermined further modulated carrier frequencies substantially different from the aforesaid carrier frequencies, means for separating the two modulated carrier outputs received in each of the two receiving equipments and means for combining and utilising the four modulated carrier outputs, two derived in each receiving equipment.

The two said carrier frequencies may be adjacent frequencies and the two said further carrier frequencies may also be adjacent frequencies and each receiving equipment may comprise a broad band receiver having an acceptance band wide enough to cover the two frequencies accepted by said equipment. Alternatively, if the two said carrier frequencies and also the two said further carrier frequencies are not adjacent each receiving equipment may comprise a filter adapted to separate the two frequencies accepted by said equipment and feeding into two receiving paths, one for one frequency and one for the other.

In the principal application of the invention, which is to very high frequency radio communication, there are two geographically spaced aerial systems comprising two spaced reflectors and four aerial elements (two transmitting and two receiving) one transmitting element and one receiving element being co-operatively associated with one reflector and the other transmitting element and the other receiving element being associated with the other reflector.

A two station radio communication system in accordance with this invention comprises two stations each according to the invention as hereinbefore defined, and each having two receivers adapted to accept the adjacent carrier frequencies transmitted from the other station. To quote practical figures, the frequency spacing between the adjacent frequencies transmitted by each of the two stations might be about 4 mc./s., while the frequency spacing between the pair of frequencies transmitted by one station and the pair transmitted by the other should be several times the aforesaid spacing, e.g. 20 mc./s.

The invention is illustrated in and further explained in connection with the accompanying drawings.

Figure 1 is a simplified block diagram showing a system comprising two cooperating stations in accordance with this invention; Figures 2, 3, 4 and 5 are conventional response-frequency curves for various parts of the apparatus shown in Figure 1; and Figure 6 shows one receiving equipment in a modified system in accordance with the invention.

The system shown in Figure 1 comprises two communicating V.H.F. radio stations generally designated A and B. Station A has two transmitters $T_1$ and $T_2$ operating on two adjacent carrier frequencies $F_1$ and $F_2$ respectively. These frequencies may, as a practical example, be spaced 4 mc./s. apart. Both transmitters are modulated by the same intelligence in the example shown by a common modulator $M_1$. The station has two aerial systems which are geographically spaced apart, one consisting of a directional reflector $P_1$, with two aerial elements $V_1$ and $H_1$ associated therewith, and the other consisting of a reflector $P_2$ with two aerial elements $V_2$ and $H_2$ associated therewith. The aerial systems at station A are, of course, trained on station B and the generally similar aerial systems at station B are trained on station A. The aerial elements may be of any convenient known form, for example, dipoles with reflectors, and the two elements $V_1$ and $V_2$, one in each reflector, are vertically polarized, while the two remaining elements $H_1$ and $H_2$, also one in each reflector, are horizontally polarized. The transmitter $T_1$ feeds the horizontally polarized aerial $H_1$ and the transmitter $T_2$ feeds the horizontally polarized aerial $H_2$. Station B has two transmitters $T_3$ and $T_4$ modulated by the same intelligence—as shown by a common modulator $M_2$—and two reflectors $P_3$ and $P_4$, each containing two aerial elements $V_3$ and $H_3$ or $V_4$ and $H_4$ of which the elements $V_3$ and $V_4$ are vertically polarized and the elements $H_3$ and $H_4$ are horizontally polarized. The transmitters $T_3$ and $T_4$ transmit carriers $F_3$ and $F_4$ respectively. These frequencies may, as a practical example, also be spaced 4 mc./s. apart. The spacing of 4 mc./s. at each of the two stations is chosen as a suitable value such as will enable convenient separation of the two frequencies by relatively simple filtering. It is not enough ordinarily to give frequency diversity, but if it does no deterioration of performance results. The frequencies $F_3$ and $F_4$ are spaced from the frequencies $F_1$ and $F_2$ by several times the 4 mc./s. spacing, e.g. a spacing of 20 mc./s. may in practice be adopted in order to ensure that the high-powered transmitters shall not overload the adjacent receivers by unavoidable coupling.

At station A there are two similar receivers proper $R_1$ and $R_2$ fed respectively from the vertically polarized receiving aerials $V_1$ and $V_2$. The acceptance band of each of these receivers is wide enough to include both frequencies $F_3$ and $F_4$ transmitted from station B. Figure 2 shows a suitable acceptance band for each of the receivers $R_1$ and $R_2$. Each of these receivers $R_1$ and $R_2$ feeds into a pair of selective filters $F_{13}$ and $F_{14}$ for the receiver $R_1$, and $F_{23}$ and $F_{24}$ for the receiver $R_2$. These filters are adapted to separate the two frequencies $F_3$ and $F_4$ fed thereto and may have response characteristics as shown in Figure 3. The outputs from all four filters $F_{13}$, $F_{14}$, $F_{23}$ and $F_{24}$ are fed to any suitable known combining unit represented by the block $C_A$, the output of which is taken to utilization means, not shown.

The receiving equipment in station B is generally similar to that in station A. It comprises two receivers $R_3$ and $R_4$ fed respectively from the horizontally polarized aerials $H_3$ and $H_4$ and each having a pass band as shown in Figure 4 wide enough to accept both the frequencies $F_1$ and $F_2$. These receivers feed into separating filters $F_{31}$ and $F_{32}$ for the receiver $R_3$ and $F_{41}$ and $F_{42}$ for the receiver $R_4$. The response characteristics of these filters may be as shown in Figure 5. The outputs from the four filters are combined in a combining unit $C_B$ and fed to utilisation means, not shown.

It will be seen that the simple installation of Figure 1 in effect provides quadruple diversity working, the transmission paths between the stations being represented conventionally by arrow headed chain lines marked with the respective carrier frequencies. There are, however, only two geographically spaced systems at each station while, furthermore, each receiving aerial feeds into only one receiver proper, an arrangement which incidentally makes for improvement in signal/noise ratio.

The specific values of frequency separation hereinbefore given are by way of example and in no sense limiting and other values may be used. With a separation of 4 mc./s. between the two frequencies transmitted by the transmitters of one station it is entirely practical to use, at each station, receivers ($R_1$ and $R_2$ at station A and $R_3$ and $R_4$ at station B of Figure 1) with acceptance bands wide enough to cover both frequencies to be received at that station. If, however, it is desired to space the frequencies transmitted from a station much further apart than this—if, in fact, it is desired to separate the figures $F_1$ and $F_2$ on the one hand and $F_3$ and $F_4$ on the other, by more than about 6 mc./s.—it becomes difficult or impracticable to make receivers or amplifiers of good signal to noise ratio and with a sufficiently wide acceptance band to cover the two frequencies ($F_1$ and $F_2$ or $F_3$ and $F_4$) to be handled. Thus, for example, if a frequency separation of 28 mc./s. instead of 4 mc./s. were required between the frequencies $F_1$ and $F_2$ and between the frequencies $F_3$ and $F_4$, it would not be practical to use the receiving arrangements of Figure 1 with its receivers $R_1$, $R_2$, $R_3$, $R_4$, each of wide enough acceptance band to cover a pair of frequencies. In such a case an arrangement as illustrated by Figure 6 would be used. Figure 6 shows only the receiving circuits fed from the receiving aerial element $V_1$ but it is to be understood that the receiving circuits from the receiving aerial elements $V_2$ (at station A) and $H_3$ and $H_4$ (at station B) are similar. Referring to Figure 6 the signals received by the element $V_1$ are fed to a branching filter *B*, which separates the two frequencies $F_3$ and $F_4$ and feeds them respectively to two receivers $R_1^{1}$ and $R_1^{11}$ one for $F_3$ and the other for $F_4$. If, as will probably be the case in practice, the receivers $R_1^{1}$ and $R_1^{11}$ are of the frequency changing type they could have a common frequency changing local oscillator (not shown) in which case the succeeding filters $F_{13}$ and $F_{14}$ would be selectively responsive to the frequencies $F_3$ and $F_4$ repsectively as in Figure 1. However the two receivers $R_1^{1}$ and $R_1^{11}$ could each have its own local oscillator and the two local oscillation frequencies could be spaced apart by the same amount as the frequencies $F_3$ and $F_4$, in which case the filters $F_{13}$ and $F_{14}$ would of course be similar intermediate frequency filters both centred on the same frequency.

Obviously, if desired, in both Figures 1 and 6, frequency changing means and filtering may be provided in the receiving sections and/or the filtering sections of the paths. For simplicity in drawing, however, no such frequency changing means have been shown, the figures being drawn on the assumption that all the operations are performed at the received frequencies though, in practice, for obvious reasons, frequency changing would almost certainly be resorted to in accordance with practice well known per se.

We claim:

1. A radio communication station comprising two geographically spaced transmitting aerial elements having the same polarization, two transmitters each connected to a different one of said aerial elements, each of said transmitters being adapted to operate at a different one of two carrier frequencies, means for modulating both carriers with the same intelligence, two spaced receiving aerial elements having the same polarization as one another, said polarisation being at right angles to the polarization of the transmitting aerial elements, one being near one of said transmitting aerial elements and the other being near the other transmitting aerial element, two receiving equipments each fed from a different one of the receiving aerial elements and each adapted to accept both of two predetermined further modulated carrier frequencies substantially different from the aforesaid carrier frequencies, means for separating the two modulated carrier outputs received in each of the two receiving equipments and means for combining and utilizing the four modulated carrier outputs, two derived in each receiving equipment.

2. A station as claimed in claim 1 wherein the two said carrier frequencies are adjacent and the two said further carrier frequencies are also adjacent and each receiving equipment comprises a broad band receiver having an acceptance band wide enough to cover the two frequencies accepted by said equipment.

3. A station as claimed in claim 1 wherein each receiving equipment comprises a filter adapted to separate the two frequencies accepted by said equipment and feeding into two receiving paths, one for one frequency and one for the other.

4. A station as claimed in claim 1 and comprising two geographically spaced aerial systems comprising two spaced reflectors and four aerial elements (two transmitting and two receiving) one transmitting element and one receiving element being co-operatively associated with one reflector and the other transmitting element and the other receiving element being associated with the other reflector.

5. A two station radio communication system comprising two stations each as described in claim 1 and each having two receiving equipments adapted to accept the adjacent carrier frequencies transmitted from the other station.

References Cited in the file of this patent

UNITED STATES PATENTS

| | | |
|---|---|---|
| 1,477,645 | Hall | Dec. 18, 1923 |
| 1,598,663 | Stone | Sept. 7, 1926 |
| 1,853,021 | Alexanderson | Apr. 12, 1932 |
| 2,302,852 | Goddard | Nov. 24, 1942 |
| 2,549,423 | Carlson | Apr. 17, 1951 |